June 2, 1953 R. T. HAGGERTY 2,640,702

TONE ARM POSITIONING MECHANISM FOR AUTOMATIC RECORD CHANGER PHONOGRAPHS

Filed April 26, 1946 3 Sheets-Sheet 1

INVENTOR
RIDGEWAY T. HAGGERTY
BY James & Franklin
ATTORNEYS

INVENTOR
RIDGEWAY T. HAGGERTY
BY
James & Franklin
ATTORNEYS

TONE ARM POSITIONING MECHANISM FOR AUTOMATIC RECORD CHANGER PHONOGRAPHS

Filed April 26, 1946

INVENTOR
RIDGEWAY T. HAGGERTY
BY
James & Franklin
ATTORNEYS

Patented June 2, 1953

2,640,702

UNITED STATES PATENT OFFICE 2,640,702

TONE ARM POSITIONING MECHANISM FOR AUTOMATIC RECORD CHANGER PHONOGRAPHS

Ridgeway T. Haggerty, Richmond Hill, N. Y., assignor to General Instrument Corporation, Elizabeth, N. J., a corporation of New Jersey Application April 26, 1946, Serial No. 665,016

8 Claims. (Cl. 274—10)

This invention relates to a record changer phonograph and more particularly to a record changer phonograph of the record drop-feed or gravity-feed type in which the records may be automatically played on both of their opposite sides.

The prime object of the present invention centers about the provision of a record changer phonograph in which there are arranged in vertical superposed relation a record supply station, a record playing station and a played record receiving station, and in which the records drop-fed individually from the supply station are played on their opposite sides at the playing station from which the individual played records are then drop-fed to the record receiving station.

Another object of the present invention is directed to the provision of such a record changer phonograph designed to permit a supply of records to be selectively played either on their opposite sides or on one side only.

A further object of the invention pertains to the provision of a record changer phonograph of this nature in which either or both of the above stated objects may be achieved or carried out with a record supply containing intermixed records of different sizes such as 10 and 12 inch records.

In carrying out these stated objects, it is the particular object of the present invention to produce:

(1) A novel mechanism for automatically controlling the initial playing position of the tone arm for a record changer in which the record at the playing station is to be played on its opposite sides or selectively on one side only; and (2) A novel mechanism for bringing the phonograph record changer to a stop after the last record of the record supply fed to the playing station has been played on its two sides at the playing station.

This application is related to the copending application of Maxwell James and Berne N. Fisher, Serial No. 663,016, filed April 18, 1946, now Patent No. 2,601,986, in which application the complete phonograph record changer of the present invention is disclosed.

To the accomplishment of the foregoing and such other objects as may hereinafter appear, the invention pertains to the novel mechanism for automatically controlling the initial playing positions and the stop position of the tone arm of the record changer, as sought to be defined in the appended claims and as described in the following specification, taken together with the accompanying drawings in which:

Fig. 7 is a top plan view of the mechanism for determining the initial playing position of the tone arm and for determining the stopping of the phonograph, this view being related to Figs. 3 to 7.

*General assembly and operation of the record feed and playing mechanisms*

Figure 1:
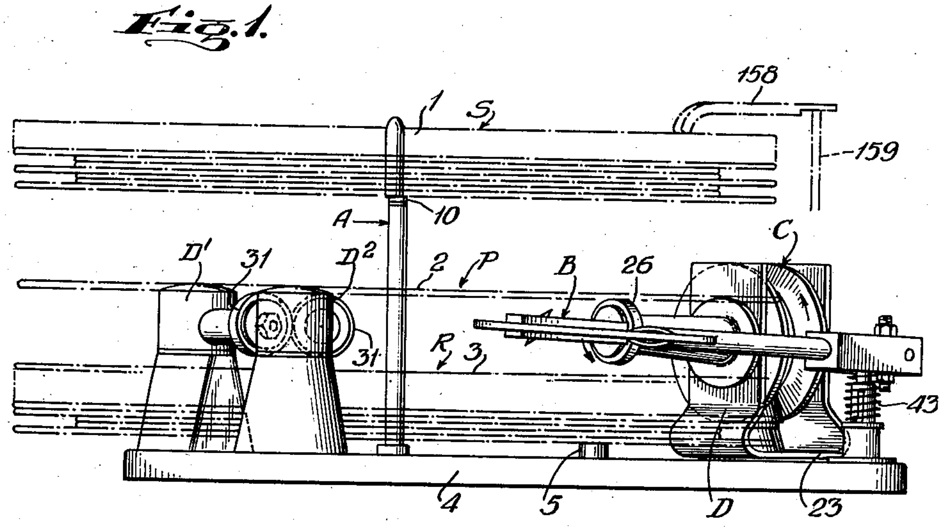
Fig. 1 is an elevational view of the top of the record changer phonograph of the invention showing the position the parts assume when ready for bottom side playing of a record.
Figure 2:
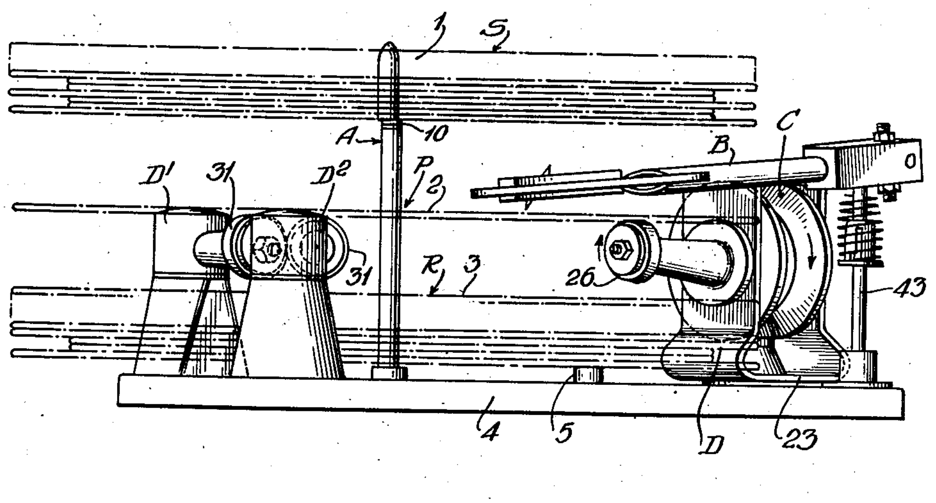
Fig. 2 is a similar view thereof and showing the position the parts assume when ready for top side playing of a record.

Referring now more in detail to the drawings, and referring first to Figs. 1 and 2 thereof, the record changer phonograph of the present invention comprises a drop-feed, double-side-playing record changer phonograph having in vertical superposed relation a record supply station generally designated as S, a record playing station generally designated as P, and a played record receiving station generally designated as R, and comprising means for supporting one or more records such as the supply of records 1 at the record supply station, means for drop-feeding a record from the supply station such as the record 2 to the playing station, means at the record playing station for playing first one side such as the under side of the record 2 (see Fig. 1) and then the other side such as the top side of the record 2 (see Fig. 2), and means for then drop-feeding the played record 2 to the played record receiving station such as is illustrated by the record 3 at this latter station.

The means for supporting the record supply at the record supply station S may take the form of any known magazine supporting means for record changers of the drop-feed type, and in the present embodiment of the invention such means is combined with the means for drop-feeding a record from the record supply to the record playing station, this combinative means being embodied in the central spindle device generally designated as A. This central spindle device at the record feeding button 10 supports a stack of records 1 at the supply station as depicted in Figs. 1 and 2 of the drawings, from which the bottommost record is drop-fed by the button 10 in the operation of the machine to the playing station P, guided thereto by the said central spindle. The record 2 is supported as a single record at the playing station, and after its opposite sides are played it is drop-fed to and stacked on a stationary platform 4 which may be provided with the receiving stud supports 5, 5 movement from the playing station to the record receiving station being also guided by the central spindle A, the played records stacking up into the record stack 3 shown in Figs. 1 and 2.

The means at the record playing station P for playing first one side and then the other side of the record comprises in combination, a reproducer or tone arm B which is operable to a position for playing the bottom side of the record depicted in Fig. 1 and to a position for playing the top side of the record depicted in Fig. 2, and a record rotating mechanism generally designated as C which is operable as indicated by the arrows in Figs. 1 and 2 of the drawings for rotating the record 2 at the playing station first in one direction for bottom side playing and then in the reverse direction for top side playing.

Preferably the record rotating means C has embodied therein means for supporting the record at the playing station and this part of the mechanism generally designated as D is combined with two other spaced supports D′ and D$^2$ for receiving and supporting the record at the playing station.

These record receiving and supporting means D, D′ and D$^2$ are also preferably made to constitute the means for drop-feeding the record from the playing station P to the played record receiving station R after both sides of the record have been played at the playing station or after one side only of the record has been played at the record playing station if and when such latter method of playing is selected as the operation for the phonograph.

The record receiving and supporting means D, D′ and D$^2$ are in a position in Figs 1 and 2 to intercept and receive the lowermost record dropped from the stack supply 1 and to support the same for a playing operation. This means also embodies driving elements including the record engaging wheels 26, 31 and 31 forming part of the record rotating means C which rotate the record at the playing station in either of its opposite directions. When a record has been played at the playing station, the record receiving and supporting means D, D′ and D$^2$ are moved outwardly about their vertical axes (simultaneously) to record non-supporting positions; and in their movement to such positions the played record 2 is released from the said supporting means and therefore is drop-fed to the record receiving station R. When returned to their positions shown in Figs. 1 and 2, the receiving and supporting means D, D′ and D$^2$ intercept, receive and drive the next record fed from the bottom of the record stack 1 at the supply station.

*The Controlling Mechanism for Determining Tone Arm Position*

The record changer is adapted for playing intermixed different sized records such as 10 and 12 inch records. Mechanism is, therefore, provided for automatically determining the setting of the initial playing position of the tone arm means B to conform to the particular size of a record fed to the playing station. Automatic means is also provided for shutting off the operating motor after the last record of the supply has been played. The record at the playing station, whether it be a 10 inch record or a 12 inch record, is played, however, successively on both of its opposite sides; and, therefore, the mechanism for determining the tone arm positions, that is to say, the means for determining the setting of the initial playing position of the tone arm B as well as the means for shutting off the motor after the last record has been played, is so designed that it will come into operation only after the record has been played on both of its opposite sides.

Figures 3, 4, 5, 6, 7:
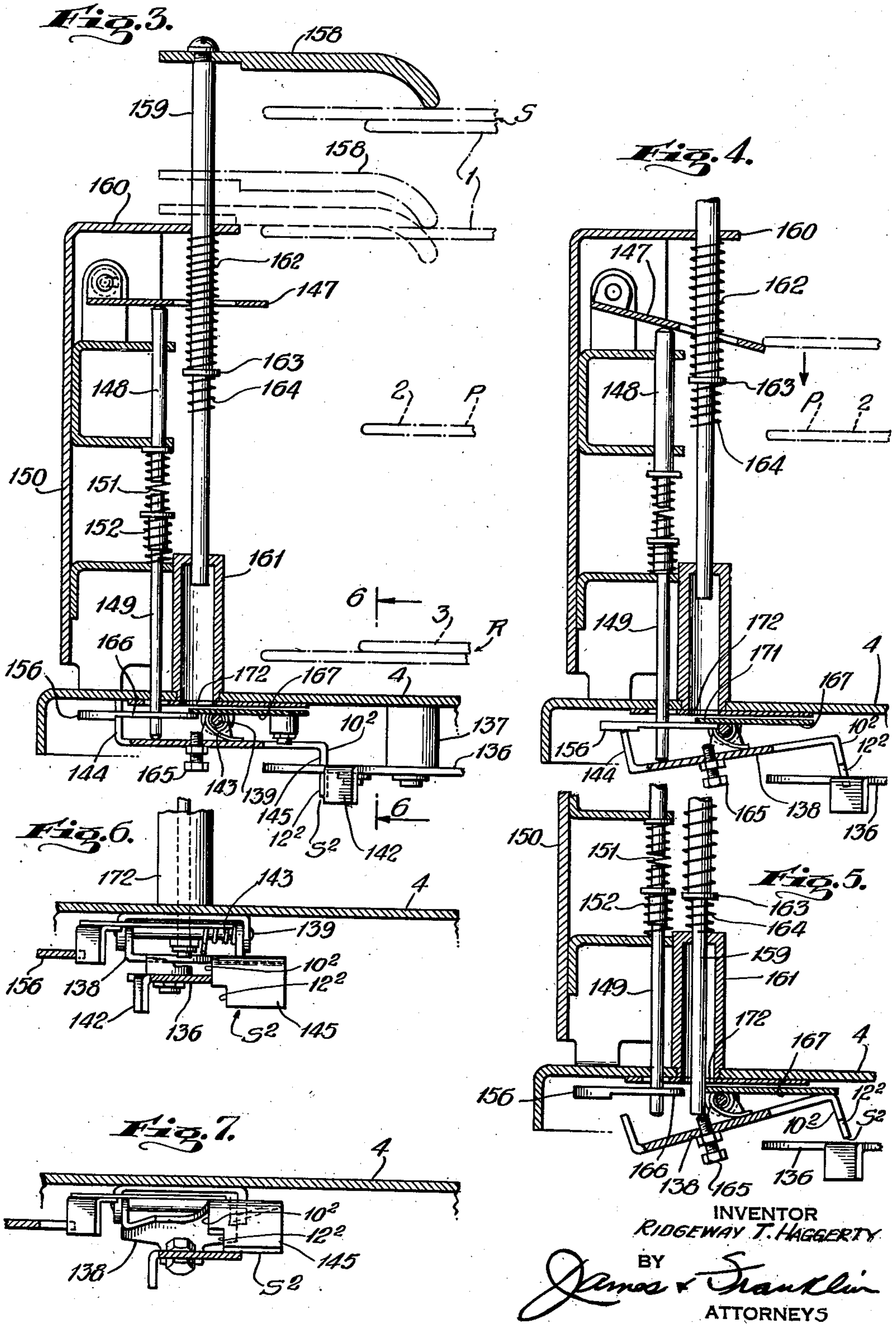
Fig. 3 is an elevational view with parts shown in section taken in the plane of the line 3—3 of Fig. 8, of mechanism for controlling the initial playing position of the tone arm and for controlling the operation of the stop means for the phonograph.
Fig. 4 is a view similar to Fig. 3 showing the parts in a different operative position.
Fig. 5 is a fragmentary view of the mechanism shown in Fig. 3 and showing the parts in another different operative position.
Fig. 6 is a view taken in cross-section in the plane of the line 6—6 of Fig. 3 and showing the parts in one operative position.
Fig. 7 is a view of parts shown in Fig. 6 and taken from the same viewpoint and showing the parts in a different operative position.

The combination employing both of these automatic means are shown in Figs. 1 to 9 of the drawings. Referring first to Figs. 1, 2 and 3, intermixed different sized records 1 are shown at the supply station S, a record 2 of the larger or 12 inch size is shown at the playing station P in Figs. 1 and 2 and a record of the smaller or 10 inch size is shown at the playing station P in Fig. 3, a stack of records 3 being shown at the record receiving station R in these figures.

Figure 8:
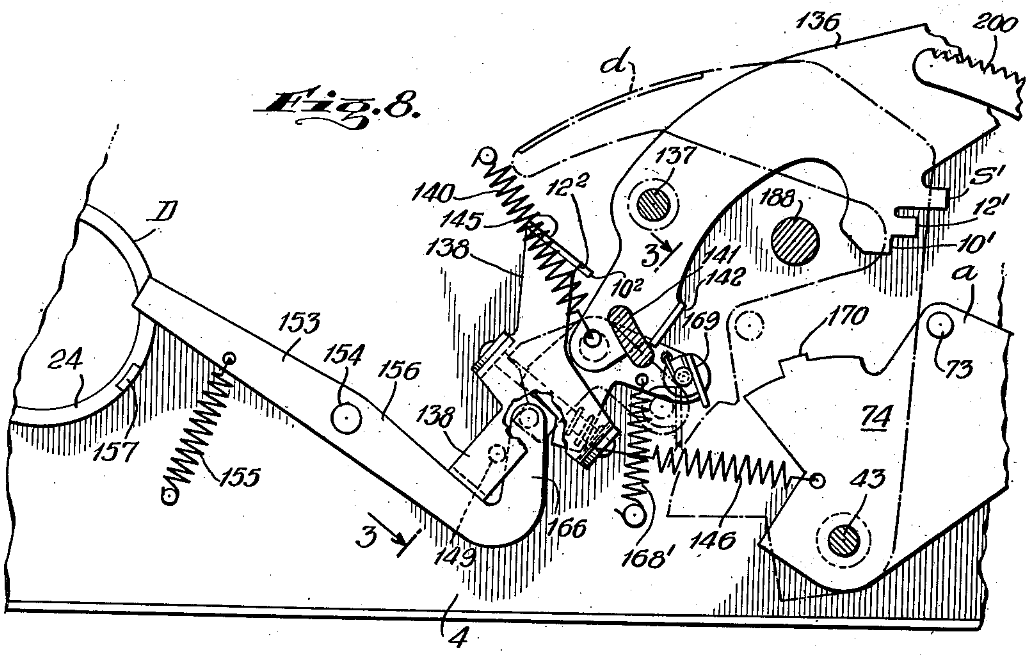
Figure 9:
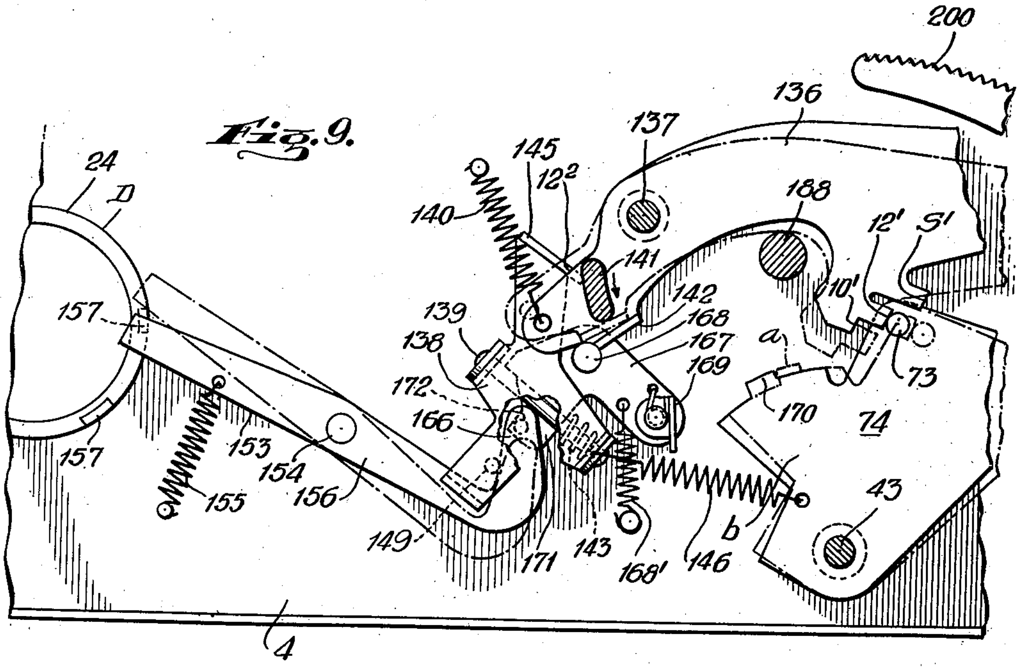
Fig. 9 is a view similar to Fig. 8 showing the parts in a different operative position.

The sweep or swinging movements of the tone arm B are produced by the swinging movements imparted to a sweep lever 74 (Figs. 8 and 9) which is keyed to the tone arm support 43, this lever being provided with a cam follower 73 which also serves here as the element which is engaged by a stop means of the automatic mechanism involved. Referring now to Figs. 8 and 9, the operated or controlled part of this automatic mechanism comprises a stop lever 136 suspendedly supported in the platform 4 and fulcrumed as at 137, and a control lever 138 similarly supported and fulcrumed at 139. The stop lever 136 is spring-loaded for movement in one direction by the spring 140 and is operated for movement in the opposite direction by a lug 141 formed on the main cam (not shown) of the machine having a cam shaft 188. In Fig. 8 this lug is in the cam stop position and in Fig. 9 the lug is shown moving in the arrowed direction and is in a position close to the end of the cam cycle. The stop lever 136 is provided with a flange 142 in one of its arms for cooperation with this lug 141, and is formed in the other of its arms with three stop elements in the form of teeth designated 10′, 12′ and s′, representing, respectively, the 10 inch, 12 inch and motor shut-off stop positions of this stop lever.

The control lever 138 comprises a reversely bent lever spring-loaded at its fulcrum by a spring 143, one bent arm of the lever 144 serving as a stop means normally engaging the underneath of the platform 4 (see Fig. 3) and the other bent arm 145 of the lever being formed with toothed surfaces designated as 10$^2$, 12$^2$ and s$^2$, representing the control stops for the 10 inch, 12 inch and motor shut-off record or tone arm positions. These control stops cooperate with an edge of the stop lever 136.

The control lever 138 is adapted to be moved into three different positions indicated in Figs. 3, 4 and 5, respectively. In Fig. 3, the control stop $10^2$ is engaged by the stop lever 136, in Fig. 4 the control stop $12^2$ is engaged by the stop lever 136, and in Fig. 5 the control stop $s^2$ is so positioned as to permit the stop lever 136 to move under the control lever 138, so as to determine respectively the 10 inch, the 12 inch and the motor shut-off or stop positions of the stop lever 136.

During a cycle of operation of the main cam (represented here by the lug 141), rotating about the cam shaft 188, the sweep lever 74 (and, therefore, the tone arm B) is moved from the dash-and-dot line position *d* to the full-line position *a* depicted in Fig. 8 and then to a position determined by the stop lever 136, Fig. 9 showing the stop lever determining the position of the sweep lever for a 12 inch record and, therefore, for its *b* position. At the beginning of the cam cycle, the stop lever 136 is positioned as shown in Fig. 8, the lug 141 engaging the flange 142 of the stop lever and holding the stop lever in its spring tensioned position. During the initial movement of the cam cycle, the lug 141 of the cam moves counterclockwise as viewed in Fig. 8, and as soon as this lug passes the stop lever flange 142, the lever is released and is actuated by its spring 140 for cooperation or engagement with the control stops of the control lever 138. In Fig. 9 the stop lever 136 is shown in engagement with the 12 inch control stop of the control lever. During the continued cycle of rotation of the main cam, the sweep lever 74 is swung outwardly to its stop or *a* position, and when swung inwardly by the main cam, lightly assisted by the spring 146, the follower pin 73 engages the 12 inch stop of the stop lever and thereby the tone arm B is located at its initial playing position for a 12 inch record. At the end of the cam cycle, the lug 141 again engages the stop lever flange 142 (this is shown about to engage in Fig. 9), and the final increment of movement of the cam in moving the lug 141 to the position shown in Fig. 8 moves the stop lever 136 from its stop determining position shown in Fig. 9 to its sweep lever release position shown in Fig. 8, thus permitting the sweep lever to freely move inwardly for a tone arm playing operation.

For a 10 inch record, the stop lever 136 is engaged by the control lever 138 as depicted in Fig. 3, and under this condition the sweep arm or lever 74 will be engaged by the stop tooth 10′ of the stop lever, thereby positioning the sweep arm 74 and consequently the tone arm in the initial playing position for a 10 inch record. Fig. 4 depicts the engagement between the stop lever and the control lever for the cycle of operation above described in connection with Fig. 9. When the control lever 138 is moved to the position shown in Fig. 5, the stop lever 136 is freed to move underneath the control stop surface $s^2$, and under this condition the stop lever 136 will assume the dot-and-dash line position shown in Fig. 9 at which time its stop $s'$ will be engaged by the sweep arm follower pin 73 to determine or locate the sweep lever and its tone arm in the *a* or stop position shown in dot-and-dash line in Fig. 9 of the drawings.

These operated parts of this automatic mechanism are actuated by devices set into operation by the records, the operation of which, however, is rendered effective only after both sides of a record have been played. This functioning is carried out for the positioning of the tone arm for 10 and 12 inch records as well as for bringing the machine to a stop after the last record, 10 or 12 inch, has been played.

For determining the setting of the tone arm to conform to the particular size of a record fed to the playing station, there is provided a device or feeler 147 interposed in the path of feeding movement of a 12 inch record (see Fig. 3) so as to be operated by the 12 inch record, said device when so operated being connected to operate the control lever 138 by means of the rods 148 and 149 supported for vertical movement in a bracket generally indicated as 150, the rods having interposed therebetween a spring 151, a second spring 152 being active for returning the rod 149 to its upper or normal position. These parts are normally held by the springs 151 and 152 in the position shown in Fig. 3. When a 12 inch record is dropped from the supply station to the playing station as depicted in Fig. 4, the device or feeler 147 is displaced and, therefore, actuated by the record to move the rods 148 and 149 to the position shown in Fig. 4 for moving the control lever 138 to the position shown in this figure. In the cycle of which the feeding of this record forms a part, the tone arm is thereby positioned for initial engagement with a 12 inch record. When a 10 inch record is dropped to the playing station as indicated in Fig. 3, the feeler device 147 is not actuated and, therefore, the control lever 138 remains in its normal (operated by spring 143) position shown in Fig. 3, in which event the tone arm is positioned for initial engagement with a 10 inch record.

The operation of the feeler device 147 and the rods 148 and 149 is, however, momentary only, these parts being spring-returned to their normal position (Fig. 3) as soon as a 12 inch record has passed and has been fed to the playing station. Since it is desired to maintain or retain the determining position of the control lever 138 for both of the opposite sides of the record which has been fed, means are employed for holding the control lever in its determining position for the setting of the tone arm for the playing of first one side and then the other side of the record, and means are further employed for returning the control lever or member 138 to its normal position after the tone arm has thus been set for the playing of both sides of the record.

To accomplish these last recited purposes, there is provided a lever 153 fulcrumed on the platform 4 at 154 and spring-loaded by the spring 155, the said lever having an arm 156 which mates with the up-turned stop end 144 of the control lever 138 in the following manner—when the stop lever is in its normal 10 inch position shown in Fig. 3, the arm 156 of the lever 153 engages the stop end 144 of the control lever as shown in Fig. 3, and when the stop lever is moved to the position shown in Fig. 4, this arm 156 is spring-urged to the position shown in Fig. 4, above the stop end 144 thereby forming means for holding the control lever 138 in this position. Fig. 8 shows the position of the arm 156 corresponding to that of Fig. 3, and Fig. 9 shows the position of the arm corresponding to that of Fig. 4. Therefore, when the control lever 138 is momentarily actuated to its Fig. 4 position by a 12 inch record moving to the playing position, the control lever is held in this position by the lever 153.

The lever 153 is actuated after both sides of the playing of every record and, therefore, after both sides of a 12 inch record have been played, this lever being at such time actuated from the full line to the dash-and-dot line positions shown in Fig. 9. This is accomplished by operating the lever 153 by an element of the record feeding means such as by a collar 24 united to the part 23 of the supporting means D and rotatable therewith in the platform 4. This collar is provided with a lug 157 at its underside so positioned that when the record supporting means D is oscillated toward the end of its record releasing stroke, the lug 157 engages the free arm of the lever 153 to move the same from the full line position to the dash-dotted line position shown in Fig. 9. The control lever 138 is thereby released; and the lever 153 returns to its Fig. 8 position. Thus it is when a record has been played on its opposite sides and is drop-fed to the record receiving station; that the control lever 138 is returned to its normal 10 inch position. A new record is drop-fed to the playing station at the end of the return oscillating stroke of the supporting means D, and, therefore, the control lever 138 has been made ready for another tone arm determining operation.

The means for determining the stop operation of the machine comprises a record follower 158 rotatably mounted on a rod 159 which is vertically movable in the spaced bearings 160 and 161 under the influence of a spring 162 anchored between a collar 163 and the bearing 160, the follower 158 bearing or resting upon the top record of the record stack 1 (Fig. 3). A second spring 164 is provided active as shown in Fig. 5 between the collar 163 and the lower rod bearing 161. The record follower rod 159 is designed to operate the control lever 138 to the stop position shown in Fig. 5 by the engagement of the lower end of the rod with an adjustable screw 165 provided in the control lever 138. The parts are so dimensioned and designed that when, as shown in the dot-and-dash line positions of Fig. 3, the record follower 158 is released by the drop-feeding of the last supply record 1 to the playing station, the rod will be in a condition to be moved by its spring to a position for operating the control lever 138 to its stop determining position shown in Fig. 5.

However, it is desired to make effective this stop operation only after both sides of the record which has been fed to the playing station have been played. This is accomplished by interposing in the path of movement of the rod 159 an element for restraining the rod from becoming effective, which element is removed as a restraining means only after both sides of the record have been played. In the embodiment of the present invention, two such elements are utilized, one in the form of a finger piece 166 extending from the lever arm 156, and the other in the form of a lever 167 fulcrumed at 168 and controlled by a spring 169' and having in one of its arms a spring controlled pawl 169 which is adapted to be engaged by a tooth 170 formed in the sweep lever 74. The finger piece 166 and the arm 171 of the lever 167 are adapted to cover an opening 172 through which the rod 159 is movable. Fig. 3 shows the opening closed by both the finger 166 and the lever arm 171, so as to form restraining means for the downward movement of the rod 159, and Fig. 5 shows this opening uncovered to permit the rod to be projected downwardly for operation of the control lever to its stop position. The levers normally occupy positions for closing the opening, so that when the last record of the stack has been fed to the playing station, the rod 159 is restrained from making its operation effective. The lever 167 is moved for clearing the opening when the sweep lever 74 is moved during each cycle from its $d$ position to its $a$ position, at which time the tooth 170 engages the pawl 169 for accomplishing this operation. In the opposite movement of the sweep lever, the tooth 170 by-passes the pawl 169, being permitted so to do by the spring of the pawl. The opening 172, however, remains covered by the finger piece 166 until the lever 153 is operated by the movement of the record supporting means D as already described. Thus when the last record fed to the playing station has been played on both of its sides, the drop-feeding of the played record to the record receiving station causes the lever 153 to be moved from its full line position shown in Fig. 9 to its dot-and-dash line position shown, thereby uncovering the opening 172. When this happens, the rod 159 completes its hitherto restrained movement and operates the control lever 138 to its stop position. When so operated, the stop lever 136 becomes effective for shutting off the motor of the machine, this latter mechanism being fully described in the aforementioned application.

The operation of the mechanism for automatically controlling the initial playing positions and the stop position of the tone arm of the present invention and the many advantages thereof for use with a record changer of the drop-feed type in which it is desired to play opposite sides of the records will in the main be fully apparent from the above detailed description of the structure and operation thereof.

It will be further apparent that many changes may be made in the described construction without departing from the spirit of invention defined in the following claims.

I claim:

1. A double-side-playing record changer adapted for playing intermixed different sized records comprising means for holding a supply of intermixed records of different sizes, means for feeding the records individually from said supply to a playing station, means for feeding a played record from said playing station to a played record receiving station, a tone arm for playing opposite sides of the fed record at said playing station, and automatic means for determining the setting of the initial playing position of the tone arm to conform to the particular size of a record fed to the playing station, said automatic means comprising a control member actuated by the particular record fed to the playing station and actuated from a given position to a position correlated to the size of the particular fed record, means for holding the control member in such latter position so as to determine the setting of the tone arm for the playing of first one side and then the other side of the particular fed record, and means operated with one of said record feeding means for releasing the control member from its held position.

2. A double-side-playing record changer adapted for playing intermixed different sized records comprising means for holding a supply of intermixed records of different sizes, means for feeding the records individually from said supply to a playing station, means for feeding a played record from said playing station to a played record receiving station, a tone arm for playing opposite sides of the fed record at said playing station, and automatic means for determining the setting of the initial playing position of the tone arm to conform to the particular size of a record fed to the playing station, said automatic means comprising a stop member for setting the tone arm, a control member for setting the stop member, said control member being actuated by the particular record fed to the playing station and actuated from a given position to a position correlated to the size of the particular fed record, means for holding the control member in such latter position so as to determine the setting of the stop member for the playing of first one side and then the other side of the particular fed record and means operated by said second record feeding means for releasing the control member from its held position.

3. A double-side-playing record changer adapted for playing intermixed different sized records comprising means for holding a supply of intermixed records of different sizes, means for feeding the records individually from said supply to a playing station, means for feeding a played record from said playing station to a played record receiving station, a tone arm for playing opposite sides of the fed record at said playing station, and automatic means for determining the setting of the initial playing position of the tone arm to conform to the particular size of a record fed to the playing station, said automatic means comprising a stop member for setting the position of the tone arm, a control member for setting the position of the stop member, a device actuated by the particular record fed to the playing station for moving the control member from a given position to a position correlated to the size of the particular fed record, means for holding the control member in such latter position so as to determine the setting of the tone arm for the playing of first one side and then the other side of the particular fed record and means operated with one of said record feeding means for releasing the control member from its held position.

4. A double-side-playing record changer adapted for playing intermixed different sized records comprising means for holding a supply of intermixed 10 and 12 inch records, means for feeding the records individually from said supply to a playing station, means for feeding a played record from said playing station to a played record receiving station, a tone arm for playing opposite sides of the fed record at said playing station, and automatic means for determining the setting of the initial playing position of the tone arm means to conform to the size of the particular record fed to the playing station, said automatic means comprising a control member movable into a determining position for a 10 inch record and into a determining position for a 12 inch record, said control member being movable to its latter position by the feeding of a 12 inch record to the playing station, means for holding the control member in such latter position for setting the tone arm for the playing of first one side and then the other side of the said 12 inch record, and means operated by one of said record feeding means for returning the control member to its position for 10 inch records after the tone arm has been thus set for both sides of said 12 inch record.

5. A double-side-playing record changer adapted for playing intermixed different sized records comprising means for holding a supply of intermixed 10 and 12 inch records, means for feeding the records individually from said supply to a playing station, means for feeding a played record from said playing station to a played record receiving station, a tone arm for playing opposite sides of the fed record at said playing station, and automatic means for determining the setting of the initial playing position of the tone arm to conform to the size of the particular record fed to the playing station, said automatic means comprising a control member movable into a determining position for a 10 inch record and into a determining position for a 12 inch record, a device interposed in the path of feeding movement of a 12 inch record and operated thereby, said device when so operated being connected to operate the control member, means for holding the control member in such operated position for setting the tone arm for the playing of first one side and then the other side of the said 12 inch record, and means operated by said record feeding means for returning the control member to its position for 10 inch records after the tone arm has been thus set for both sides of said 12 inch record.

6. A drop-feed, double-side-playing record changer phonograph adapted to play intermixed different sized records having in vertical superposed relation a record supply station, a record playing station and a played record receiving station, comprising means for supporting intermixed different sized records at the record supply station, a feeding means for drop-feeding a record from the record supply station to the record playing station, tone arm means for playing opposite sides of the record at the playing station, a means for drop-feeding a played record from the playing station to the played record receiving station, a control member for determining the initial playing position of the tone arm means, said control member being operable by the record to be played so as to determine the initial playing position of the tone arm means for that record, means for holding the control member in such position so as to determine the initial playing position of the tone arm means first for playing of one side and then the other side of that record, and means operated with one of said record drop-feeding means for releasing the control member from its held position.

7. A drop-feed, double-side-playing record changer phonograph adapted to play intermixed different sized records having in vertical superposed relation a record supply station, a record playing station and a played record receiving station, comprising means for supporting intermixed different sized records at the record supply station, a feeding means for drop-feeding a record from the record supply station to the record playing station, tone arm means for playing opposite sides of the record at the playing station, a means for drop-feeding a played record from the playing station to the played record receiving station, a control member for determining the initial playing position of the tone arm means, said control member being operable by the record to be played so as to determine the initial playing position of the tone arm means for that record, means for holding the control member in such position so as to determine the initial playing position of the tone arm means first for playing of one side and then the other side of that record, and means operated by said second record drop-feeding means for releasing the control member from its held position.

8. A drop-feed, double-side-playing record changer phonograph adapted to play intermixed different sized records having in vertical superposed relation a record supply station, a record playing station and a played record receiving station, comprising means for supporting intermixed different 10 and 12 inch records at the record supply station, a feeding means for drop-feeding a record from the record supply station to the record playing station, tone arm means for playing opposite sides of the record at the playing station, a means for drop-feeding a played record from the playing station to the played record receiving station, a control member movable into a determining position for a 10 inch record and into a determining position for a 12 inch record, said control member being movable to its latter position by the feeding of a 12 inch record to the playing position, means for holding the control member in such latter position for setting the tone arm means first for playing of one side and then the other side of said 12 inch record, and means operated with one of said record drop-feeding means for releasing the control member from its held position and returning the same to its position for 10 inch records.

RIDGEWAY T. HAGGERTY.

References Cited in the file of this patent

UNITED STATES PATENTS

| Number | Name | Date |
|---|---|---|
| 2,068,449 | Downs | Jan. 19, 1937 |
| 2,090,746 | Compare | Aug. 24, 1937 |
| 2,205,268 | Mitchell | June 18, 1940 |
| 2,295,092 | Offen | Sept. 8, 1942 |
| 2,333,414 | De Tar | Nov. 2, 1943 |
| 2,371,222 | Compare | Mar. 13, 1945 |
| 2,412,441 | Carson et al. | Dec. 10, 1946 |
| 2,457,668 | Hart | Dec. 28, 1948 |
| 2,486,898 | Wennerbo | Nov. 1, 1949 |
| 2,545,643 | Bender | Mar. 20, 1951 |

FOREIGN PATENTS

| Number | Country | Date |
|---|---|---|
| 419,299 | Great Britain | Nov. 5, 1934 |
| 459,208 | Great Britain | Jan. 4, 1937 |
| 541,156 | Great Britain | Nov. 14, 1941 |
| 111,950 | Sweden | Sept. 26, 1944 |